United States Patent [19]

Anderson

[11] 4,095,577
[45] Jun. 20, 1978

[54] CAPACITOR DISCHARGE IGNITION METHOD AND APPARATUS

[76] Inventor: Harold E. Anderson, 46267 Chuckwagon Rd., Squaw Valley, Calif. 93646

[21] Appl. No.: 663,201

[22] Filed: Mar. 2, 1976

[51] Int. Cl.² ............................................. F02P 1/00
[52] U.S. Cl. ........................... 123/148 CC; 123/148 E
[58] Field of Search ............... 123/148 CC, 148 E; 315/209 T, 218; 310/70 R, 70 A

[56] References Cited

U.S. PATENT DOCUMENTS

| | | | |
|---|---|---|---|
| 3,464,397 | 9/1969 | Burson | 123/148 CC |
| 3,465,739 | 9/1969 | Burson | 123/148 CC |
| 3,496,921 | 2/1970 | Boyer | 123/148 CB |
| 3,515,109 | 6/1970 | Farr | 123/148 CC |
| 3,542,007 | 10/1970 | Minks | 123/148 CC |
| 3,545,420 | 12/1970 | Foreman et al. | 123/148 CC |
| 3,598,098 | 8/1971 | Sohner et al. | 123/148 CC |
| 3,761,779 | 9/1973 | Carlsson | 123/148 CC |
| 3,805,759 | 4/1974 | Fitzner | 123/148 CC |
| 3,809,040 | 5/1974 | Burson et al. | 123/148 CC |
| 3,851,198 | 10/1974 | Minks et al. | 123/148 CC |
| 3,874,354 | 4/1975 | Crouch | 123/148 CC |
| 3,878,824 | 4/1975 | Haubner et al. | 315/209 T |
| 3,900,015 | 8/1975 | Mainprize | 123/148 E |
| 3,933,139 | 1/1976 | Beeghly | 123/148 CC |

OTHER PUBLICATIONS

SAE Booklet, 660021, Solid State Breakerless Flywheel Type Magnetic Ignition, Guernsey.

*Primary Examiner*—Samuel W. Engle
*Assistant Examiner*—S. A. Cangialosi
*Attorney, Agent, or Firm*—Burns, Doane, Swecker & Mathis

[57] ABSTRACT

A capacitor discharge ignition circuit, adapted for retrofitting conventional breaker point ignition systems, provides gating of the electronic switch and spark advance responsive to an electrical signal generated by the magneto coil of the conventional system and provides force commutation of the electronic switch and a selective engine shut-off. Gating of the electronic switch is induced by a voltage drop of a fixed magnitude following a wave peak of the magneto coil signal. An inductor in series with the capacitor and the electronic switch induces a reverse bias across the electronic switch following the gating thereof to force commutate the switch. Engine shut-off may be achieved by grounding the relatively low voltage induced in the magneto coil, which, during engine operation, is stepped up for charging the capacitor.

16 Claims, 4 Drawing Figures

CAPACITOR DISCHARGE IGNITION METHOD AND APPARATUS

BACKGROUND OF THE INVENTION

The present invention is directed to a capacitor discharge ignition circuit and method adapted for modification of conventional breaker point ignition systems. The circuit is also adapted to more general application to provide gating of the electronic switch and spark advance responsive to an electrical signal generated by a magneto coil, and to provide force commutation of the electronic switch.

Conventional ignition systems may employ contact breaker points to intermittently make and break a connection between a magneto coil and ground to cause periodic firing of the gap ionization discharge device through a high voltage transformer. Newer ignition systems employing capacitor discharge ignition circuits offer more desirable performance characteristics. However, retrofitting of conventional breaker point systems to convert them to capacitor discharge systems has hertofore been impractical, since such retrofitting may require remachining of the magneto, retiming of the flywheel, provision of triggering coils or removal of the breaker points. Removal of the breaker points prevents reconversion of the system to a breaker point system in the case of an electronic malfunction.

Accordingly, it is an object of the present invention to provide a novel capacitor discharge ignition circuit adapted for modification of conventional breaker point ignition systems, having an electronic switch gated by the electrical signal of a conventional magneto coil.

Another object of the present invention is to provide a novel capacitor discharge ignition circuit which may be incorporated into a conventional breaker point ignition system without removing the breaker points so that the breaker points may be reactivated in case of an electronic malfunction.

In a capacitor discharge ignition system, gating of the electronic switch must be induced at the proper time in the engine cycle. Typically this problem has been addressed by gating the switch responsive to an increase of the magneto coil waveforms to a predetermined voltage or by employing a separate trigger coil located adjacent a magnet carrying flywheel. Gating of the electronic switch responsive to the magneto coil waveform reaching a predetermined voltage may not permit proper spark timing in a retrofitted system without retiming the flywheel. It is accordingly a further object of the present invention is to provide a capacitor discharge ignition circuit, adapted for properly timed gating of the electronic switch responsive to the electrical signal produced by a conventional magneto coil.

In conventional breaker point ignition systems, the system is typically timed to fire a gap discharge ignition device nearly coincident with a peak in the magneto coil waveform. Conventional capacitor discharge circuits are biased to gate an electronic switch responsive to the magneto coil waveform increasing to a predetermined voltage, typically a predetermined negative voltage. However, at higher engine speeds the inductance and capacitance of the circuit may cause the portion of the magneto coil waveform increasing in absolute value, to retreat due to inductive blur. Due to the waveform retreat the predetermined gating voltage may be reached at a relatively later point in time. This waveform retreat may cause a retarding of the spark with higher engine speeds rather than the desired spark advance. Still a further object of the present invention is to provide spark advance in an ignition system comprised of a conventionally timed magneto and a capacitor discharge circuit.

Capacitor discharge ignition systems have achieved force commutation of the electronic switch by means of spark current. However, because of the relatively long time necessary to discharge the capacitor sufficiently to reduce the capacitor voltage below the minimum necessary to maintain the low holding currents typical of conventional electronic switches, commutation may be difficult to achieve in higher speed systems. It is accordingly yet a further object of the present invention to provide a novel method and capacitor discharge ignition circuit which achieve force computation in higher speed systems, where insufficient time is available for the requisite discharge of the capacitor by means of spark current.

These and other objects and features of the invention will become apparent from the claims and from the following description when read in conjunction with the appended drawings.

THE DRAWINGS

DETAILED DESCRIPTION

To facilitate an understanding of the method and circuit of the present invention, referencemay be had to the following detailed description of the circuit, the method of using the circuit to retrofit conventional breaker-point systems, and the operation of the circuit in performing its various functions.

The Circuit

Figure 1:
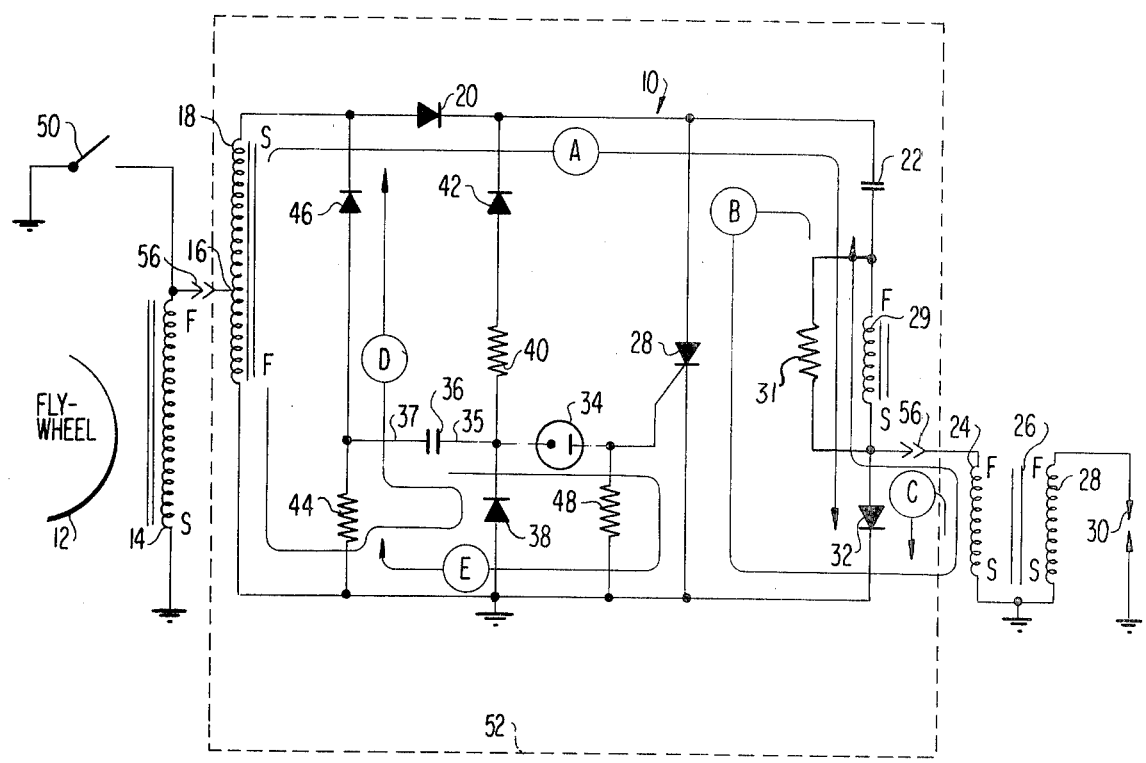
FIG. 1 is a schematic circuit diagram of an embodiment of the present invention illustrating certain current paths.
Figure 3:
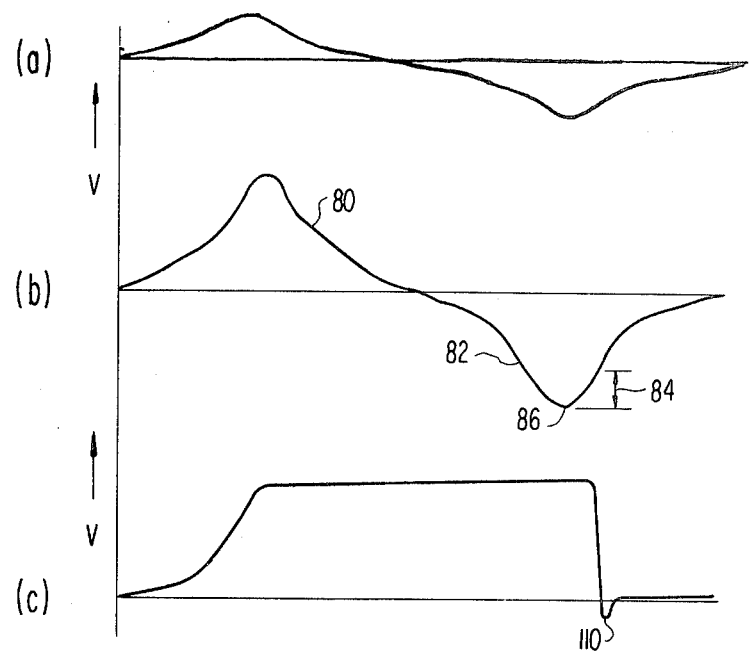
FIG. 3 is a timing diagram illustrating the waveforms occurring at various points in the circuit of FIG. 1; and, FIG. 4 is an illustration of the change of the negative components of the waveform of FIG. 3(a) at various engine speeds.

Referring first to FIG. 1, a capacitor discharge ignition system is denoted generally by the numeral 10. A flywheel 12, engaged for engine responsive rotation, carries a permanent magnet (not shown) for rotation into and out of flux cutting proximity to the magneto coil 14 to thereby operate in a conventional manner to induce a voltage in the magneto coil having a waveform as generally depicted in FIG. 3(a).

The start end of the magneto coil 14 may be grounded, and the finish end of the magneto coil 14 is connected to a tap 16 of a coil 18. The finish end of the coil 18 may be grounded while the start end of the coil 18 is connected to the anode of a diode 20. The coil 18 operates in conjunction with the magneto coil 14 to step up the voltage waveform produced by the magneto coil for application to the circuitry described below. Typically, the voltage waveform may be stepped up by a factor of six to induced a waveform as generally depicted in FIG. 3(b).

An ignition capacitor 22 may be charged by the coil 18 through diode 20 along the conventional current path denoted by the letter "A". The diode 20 will block the passing of the current induced by the negative voltage portions of the waveform illustrated in FIG. 3(b).

With continued reference to FIg. 1, the ignition capacitor 22 is connected in a discharge circuit including the primary winding 24 of a high voltage tranformer 26, and an electronic switch such as the illustrated SCR 28. It should be understood, however, that any switch capable of being electronically triggered may be substituted for the SCR 28 with appropriate changes in the polarities of the several diodes associated with the switch and appropriate changes in the polarity of waveforms applied to the switch. Specifically, the SCR 28 may be triggered into conduction by the application of a positive gate-to-cathode bias.

When triggered into conduction, the SCR 28 will effect the discharge of the capacitor 22 through the primary winding 24 of the transformer 26 and through an inductor 29 along the conventional current path denoted by the letter "B". A resistor 31 may be connected across the inductor 29. The transformer 26 may also comprise a secondary winding having more turns than the primary winding 24. It will be apparent that the discharge of capacitor 22 through the primary winding 24 will be inductively coupled to a conventional gap ionization discharge device, such as spark plug 30, by the secondary winding 28 of the transformer 26. The potential developed across the secondary winding 28 may serve as a gap ionizing potential applied to a spark plug for engine ignition.

As the magnetic field in the transformer 26 collapses upon cession of the discharge current, a current path denoted by the letter "C" may be established through a diode 32 to effect dissipation of the energy stored in the transformer and sustain the arc at the spark plug 30.

Energy may also be stored in the inductor 29 by the substantial discharge of the ignition capacitor 22 through SCR 28, and the inductor 29. As will be more fully described below, a reverse charge may be imposed on the capacitor 22 by the inductor 29, effecting free commutation of the SCR.

With continued reference to FIG. 1, a voltage breakover switch such as vacuum discharge tube 34 may be connected between the gate of the SCR 28 and a first terminal 35 of a second capacitor 36. The connection between the terminals of the vacuum discharged tube 34 and the second capacitor 36 may be grounded through a diode 38 and connected to the cathode of the diode 20 through the series combination of a resistor 40 and a diode 42. A second terminal 37 of the capacitor 36 may be grounded through a resistor 44 and connected to the anode of the diode 20 through a diode 46. The gate of the SCR 28 may be grounded through resistor 48.

A manually operable switch 50 may be employed to selectively ground the finish end of the magneto coil 14 to effect engine shut-off.

The circuit illustrated schematically in FIG. 1 employs a capacitor discharge subcircuit 52. For the purposes of illustration, the capacitor discharge subcircuit 52 is depicted as being connected to the remaining circuitry by a pair of junctions 54 and 56 which may be the points of connection when the capacitor discharge subcircuit 52 is incorporated to retrofit a conventional breaker point ignition system as described below.

RETROFITTING CONVENTIONAL BREAKER POINT IGNITION SYSTEMS

Figure 2:
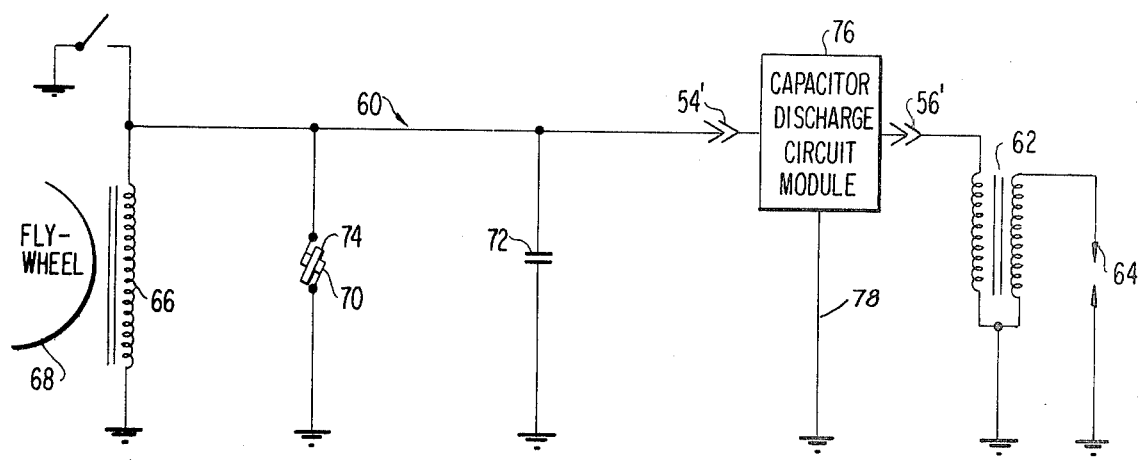
FIG. 2 is a schematic circuit diagram of an ignition system including a conventional breaker point ignition system and a capacitor discharge circuit.

Referring now to FIG. 2, a retrofitted breaker point ignition system is denoted generally by the numeral 60.

Prior to retrofitting, the breaker point ignition system may be connected to a magneto coil 66 and may include a high voltage transformer 62 coupled to a gap ionization discharge device such as spark plug 64. An electrical potential may be induced in the magneto coil 66 by engine responsive rotation of a magnetic member, such as magnetic carrying flywheel 68. The system may also include contact breaker points 70 for intermittently making and breaking a ground connection with the magneto coil 66 to fire the gap ionization discharge device 64. The conventional breaker point ignition system may also include an ignition capacitor 72.

Retrofitting of a conventional breaker point ignition system to convert the system to a capacitor discharge system may be effected by preventing the grounding of the electrical potential induced in the magneto coil through the contact breaker points and by connecting a capacitor discharge circuit module between the magneto coil 66 and the high voltage transformer 62.

The contact breaker points may be disabled by insulating the points by, for example, inserting an insulating shim 74 between the contact breaker points. When the system is retrofitted in this manner, it may readily be converted back to a breaker point ignition system by removing the shim.

The high voltage transformer 62 may be disconnected from the magneto coil 66 and a capacitor discharge circuit module 76 connected therebetween at a pair of junctions 54' and 56'. The module may also be grounded through a conductor 78. The capacitor discharge circuit module may comprise a circuit such as the circuit 52 of FIG. 1 including a capacitor and electronic switch 28 gated by a voltage drop from a negative wave peak in the magneto coil waveform.

Gating of the SCR

The SCR 28 of the circuit of FIG. 1 may be gated responsive to the waveform of the magneto coil. Referring to FIG. 3(b), the waveform as it appears across coil 18 has a positive component 80 and a negative component 82. As explained in connection with FIG. 1, the positive component 80 of the waveform may effect charging of the capacitor 22. The electronic switch 28 may be gated responsive to a voltage drop 84 from the wave peak 86 in the negative component of the waveform, as will be explained hereinafter.

When the waveform of FIG. 3(b) goes negative, the finish end of coil 18 may be positive with respect to the start end thereof. The voltage across the coil 18 may induce the charging of the second capacitor 36 along the conventional current path designated by the Letter"D", passing from the finish end of the coil 18, through the diode 38, the capacitor 36, and the diode 46 to the start end of coil 18. When the waveform of FIG. 3(b) passes its maximum amplitude (peak 86) and the absolute value of the voltage begins to decrease the potential at the negatively charged terminal 37 of the capacitor 36 may begin to decrease because the terminal 37 is grounded through the resistor 44. Since there is no discharge path for the capacitor 36, the potential at its positively charged terminal 35 may rise above ground potential as the voltage of the waveform of FIG. 3(b) decreases. When the potential at the capacitor terminal 35 reaches the ionizing voltage of the gas discharge tube 34, the tube may fire. Upon firing, the tube 34 may partially discharge the capacitor 36 thereby imposing a positive gate-to-cathode bias on the SCR 28 to effect gating of the SCR. Current associated with the aforementioned discharge of the capacitor 36 may flow along the conventional current path designated by the letter "E", from the terminal 35 through the gas discharge tube 34, the SCR 28, and the resistor 44 to the terminal 37.

After gating of the SCR, the negative voltage imposed on terminal 37 of the capacitor 36 may increase the magnitude. However, the voltage at terminal 35 of the capacitor 36 may not rise sufficiently to re-ionize the gas tube because the terminal 35 is shorted to capacitor 22 through the diode 42 and resistor 40.

Spark Advance

For efficient engine operation, it is desirable that the SCR 28 be gated at an earlier point along the waveform of FIG. 3(b) at higher engine speeds. The circuit of FIG. 1 automatically gates the SCR 28 at such an earlier point in time at higher engine speeds, thereby providing spark advance.

Figure 4:
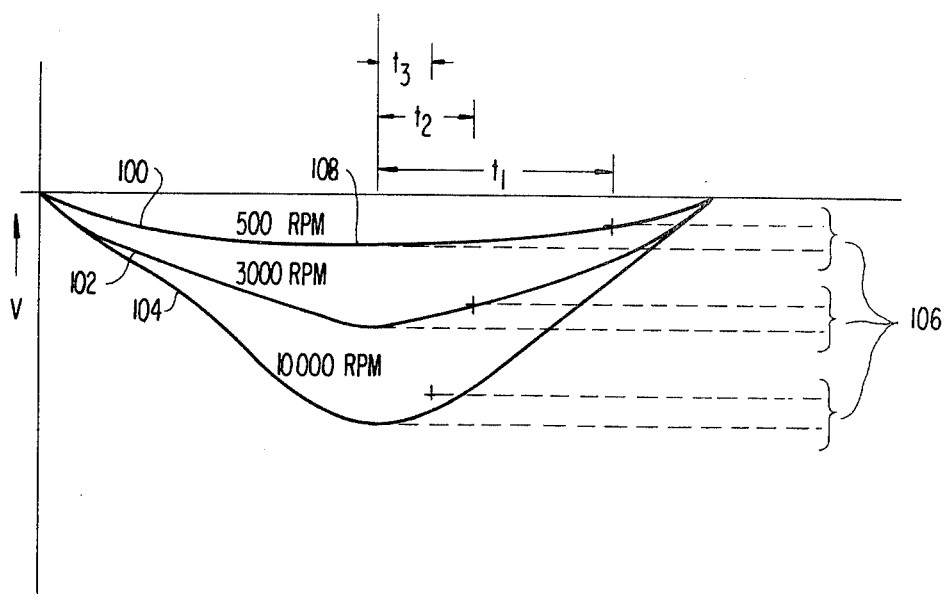

It is well known in the art that the voltage magnitude of the entire magneto coil waveform increases with increasing engine speed. The effect of this increase is illustrated in the negative component of the waveform of coil 18 by the family of voltage waveforms 100, 102 and 104 depicted in FIG. 4. Since in the circuit of FIG. 1 gating of the SCR occurs after a voltage drop of a fixed magnitude 106 from the peak negative voltage of the magneto coil waveform, speed induced increases in the magnitude of the entire magneto coil waveform may be operative to effect earlier gating of the SCR and, therefore, spark advance. This effect is illustrated with continued reference to FIG. 4 where waveform 100, 102 and 104, produced by engine speeds of 500 r.p.m. 3,000 r.p.m. and 10,000 r.p.m., respectively, have voltage waveforms which increase in amplitude as a function of engine speed. At 500 r.p.m. it takes a relatively long time interval, $t_1$, after wave peak 108 for the wave voltage to drop the requisite amount 106 to fire the gas discharge tube 34. This time interval is shortened as engine speed rises as illustrated by the time intervals $t_2$ and $t_3$ respectively related to the waveform 102 and 104.

Force Commutation

It is necessary that conduction of the SCR 28 be interrupted after firing of the gap ionization discharge device since otherwise current employed to recharge capacitor 22 will be shunted to ground through the SCR. In the circuit of FIG. 1, a reverse charge may be imposed on the capacitor 22 by the inductor 29 to reverse bias the SCR, thereby effecting force commutation.

At the firing of the gap ionization discharge device, substantial discharge of capacitor 22 may serve to temporarily store energy in the separate magnetic fields established in the inductor 29 and the transformer 26 by current flow associated with the discharge. The share of the energy from the discharge of the capacitor 22 stored in the transformer 26 and the inductor 29 may be in proportion to their inductances. Typically, the inductance of the primary winding 24 of the transformer 26 exceeds the inductance of the inductor 29 by a factor of 70. As a result, a large proportion of the energy transferred is temporarily stored in the transformer 26. As the magnetic field in the transformer 26 collapses upon cessation of the current flow, the current path denoted by the letter "C" may be established through a diode 32 to effect dissipation of the energy stored in the transformer and sustain the arc at the spark plug 30. However, sufficient energy may be stored in the inductor 29 after the substantial discharge of the capacitor 22 to partially recharge the capacitor in the reverse direction.

This reverse charging may be accomplished as, after substantial discharge of the capacitor 22, the finish end of the inductor 29 becomes positive with respect to the start end thereof. If the SCR is still conductive, the capacitor 22 may be charged in the reverse direction by current flow along the path designated by the letter "B". This effect is illustrated by the small negative spike 110 on the capacitor 22 voltage as shown in FIG. 3(c). The reverse charging of the capacitor will bias the anode of the SCR negative with respect to the cathode when the current flow induced by the inductor 29 diminishes. The SCR will cease to conduct when its anode goes negative of its cathode. By this mechanism, the SCR 28 may be force communtated to permit subsequent recharging of the capacitor 22 responsive to the magneto coil waveform.

The damper resistor 31 may be connected across the inductor 29 to protect the diode 32 from overload which may be caused by fast reversal of the voltage across the inductor 29 after discharge of capacitor 22.

Circuit Components

In the exemplary circuit of FIG. 1, the values of the various components may be as follows:

Transformer; 18; 1 to 6: primary 63 MH, 4.8 ohms secondary 950 MH, 82 ohms
Capacitor; 22; 1.4 mfd., 400V
Inductor; 29; 30 Micro H, Q 3
SCR; 28; c 106 D Typ.
Resistor; 31; 120 ohms
Gas discharge tube; 34; NE 2 100 V.
Capacitor; 36; .001 mdf, 1000V.
Resistor; 40; 120 ohms, ¼ watt
Resistor; 44; 7500 ohms, 5 watt
Resistor; 48; 6800 ohms, ¼ watt The principles, preferred embodiments and mode of operation of the present invention have been described in the foregoing specification. The invention which is intended to be protected is not however, to be construed as limited to the particular forms disclosed, since these are to be regarded as illustrative rather than restrictive. Variations and changes may be made by those skilled in the art without departing from the spirit and scope of the present invention.

What is claimed is:

1. In an ignition system including a high voltage transformer coupled to a gap ionization discharge device and connected to a magneto coil in which an electrical potential is induced by engine responsive rotation of a magnetic member through flux cutting proximity therewith and including contact breaker points for intermittently grounding the electrical potential from the magneto coil, a method of providing an ignition spark comprising the steps of:
   (a) preventing the grounding of the electrical potential through the contact points;
   (b) connecting a capacitor discharge circuit including a capacitor, which is charged by an electrical potential of a first polarity induced in the magneto coil, and an electronic switch in circuit between the high voltage transformer and the magneto coil; and,
   (c) discharging the capacitor through the transformer and the electronic switch responsive to a drop from a peak in the electrical potential of opposite polarity from said first polarity induced in the magneto coil.

2. In an ignition system including a gap ionization discharge device, an electronic switch for firing the gap ionization discharge device, a coil having an electrical potential induced therein by engine responsive rotation of a magnetic member through flux cutting proximity to the coil, and a capacitor charged by an electrical potential of a first polarity induced in said coil, said electronic switch being gated to apply the charge stored in said capacitor to the gap ionization discharge device to fire the device, the improvement wherein the electronic switch is gated in response to a predetermined drop in amplitude from a peak in the electrical potential of a second and opposite polarity induced in the coil.

3. In a capacitor discharge circuit, adapted for connection to an ignition system having a high voltage transformer coupled to a gap ionization discharge device and a magneto coil having an electrical potential induced therein by engine responsive rotation of a magnetic member through flux cutting proximity to the magneto coil, said circuit including a capacitor charged by the electrical potential of a first polarity induced in the magneto coil and discharged through the transformer responsive to the conductive state of an electronic switch, the improvement wherein the electronic switch is gated in response to a voltage drop from a wave peak in the electrical potential of a second and opposite polarity induced in the magneto coil.

4. The improvement of claim 3 wherein the electronic switch is commutated by an inductor connected in series with said capacitor.

5. In a capacitor discharge circuit adapted for connection to an ignition system having a high voltage transformer coupled to a gap ionization discharge device and a magneto coil having an alternating electrical signal of a first polarity induced therein by engine responsive rotation of a magnetic member through flux cutting proximity to magneto coil, said circuit including a capacitor charged by the electrical signal induced in the magneto coil and discharged through an SCR and primary windings of the transformer in response to a drop from the wave peak of a second and opposite polarity in the electrical signal induced in the magneto coil, the improvement comprising means for force commutating the SCR including an inductor in series with the capacitor, the transformer, and the SCR.

6. The improvement of claim 5 wherein the inductor is in series with the primary windings of the transformer.

7. The improvement of claim 6 further comprising a undirectional impedance in parallel with the primary windings of the transformer.

8. In an ignition system for an internal combusion engine including a high voltage transformer coupled to a gap ionization discharge device and connected to a magneto coil in which an electrical signal is induced by engine responsive rotation of a magnetic member through flux cutting proximity therewith, and including contact breaker points for intermittently grounding the electrical signal from the magneto coil, a method of converting the system to a capacitor discharge ignition system:

(a) circumventing the operation of the contact breaker points;

(b) disconnecting the high voltage transformer from the magneto coil; and, (c) connecting a capacitor discharge circuit including a capacitor which is charged by by an electrical potential of a first polarity induced in the magneto coil, and an electronic switch, responsive to a drop from a peak in the electrical potential of opposite polarity from said first polarity induced in said magneto coil, in circuit between the high voltage transformer and the magneto coil.

9. In an ignition system including a gap ionization discharge device, a magneto coil having an electrical signal induced therein by engine responsive rotation of a magnetic member through flux cutting proximity to the magneto, and circuit means for firing the gap ionization device, the improvement wherein said circuit means includes:

a capacitor charged by the magneto coil;

an SCR through which said capacitor is discharged to induce firing of the gap ionization device; and, means for gating said SCR responsive to a drop from a wave peak in the electrical signal induced in the magneto coil;

wherein said gating means includes a voltage responsive switch; and a second capacitor charged by the electrical signal of a first polarity induced in the magneto coil and discharged through said voltage responsive switch in response to a drop from a wave peak of an opposite polarity in the electrical signal induced in the magneto coil.

10. The improvement of claim 9 wherein said voltage responsive switch comprises a gas discharge tube with a first terminal connected to the gate of said SCR.

11. The circuit of claim 10 wherein said gating means includes:

a first diode with its anode connected to said second capacitor and its cathode connected to a first end of the magneto coil;

impedence element connecting the anode of said first diode to a second end of the magneto coil; and, a second diode with its anode connected to the second end of the magneto coil and its cathode connected to said second capacitor and the second terminal of said gas discharge tube.

12. The circuit of claim 11 wherein said gating means includes:

a third diode with its cathode connected to said first capacitor; and;

an impedance element connected between the anode of said third diode and the second terminal of said gas discharge tube.

13. The improvement of claim 9 further comprising inductive means in series with the first capacitor and said SCR for force commutating said SCR.

14. The improvement of claim 9 further comprising:

means for stepping-up the voltage induced in the magneto coil; and a manually operable switch for selectively grounding the magneto coil to shut-off the engine.

15. The improvement of claim 8 wherein the operation of the contact breaker points is circumvented by mechanically preventing movement of the breaker points into and out of contact with each other.

16. A capacitive discharge system adapted for use with a conventional ignition system in an internal combustion engine which includes a magneto coil in which an alternating electrical signal is induced by engine responsive rotation of a magnetic member through flux cutting proximity therewith, a gap ionization discharge device, and a high voltage transformer coupled to the gap ionization discharge device and responsive to the electrical signal induced in the magneto coil, said capacitive discharge system comprising:

- step-up transformer means for amplification of the electrical signal induced in the magneto coil;
- a storage capacitor coupled to said step-up transformer means and connectable to the high voltage transformer, wherein said storage capacitor is charged by an electrical signal of a first polarity induced in the magneto coil and amplified by said step-up transformer means;
- electronic switch means for discharging the charge stored in said capacitor through said high voltage transformer;
- gating circuit means for activating said electronic switch means responsive to the electrical signal induced in the magneto coil, said gating circuit means including:
  - a gating capacitor which is charged by an electrical signal of a second polarity induced in the magneto coil and amplified by said step-up transformer means; and
  - a gas discharge tube connected to said gating capacitor and responsive to a predetermined drop in the electrical signal of the second and opposite polarity, induced in the magneto coil and amplified by the step-up transformer means, from a peak amplitude value to discharge said gating capacitor and render said electronic switch means conductive; and
- electronic switch force commutating means for positively commutating said electronic switch means including an inductor connected in series with said storage capacitor and said electronic switch means, said inductor storing potential during the discharge of said storage capacitor through said high voltage transformer and recharging said storage capacitor in a reverse direction from that in which it is charged by the electrical signal of said first polarity, said reverse charging acting to positively commutate said electronic switch means.

* * * * *